Jan. 21, 1941.　　　M. R. KOERNER　　　2,229,459
TANK VALVE LEVER
Filed July 12, 1939
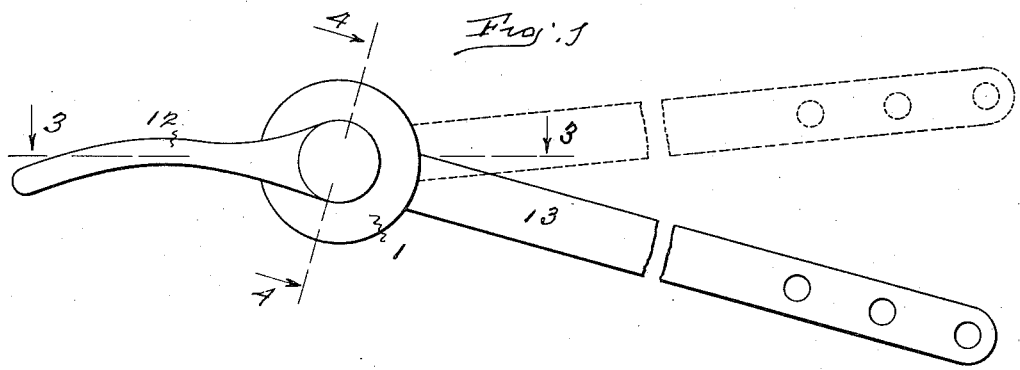
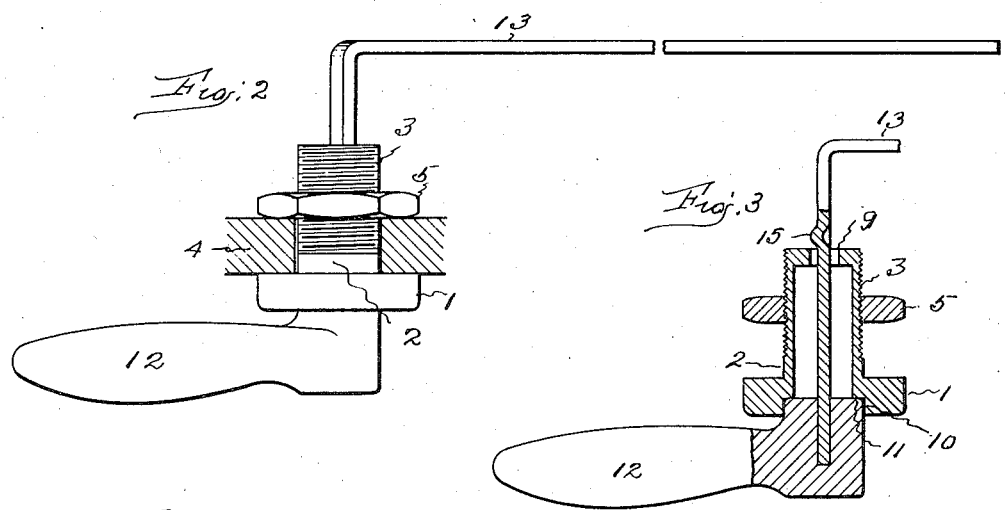
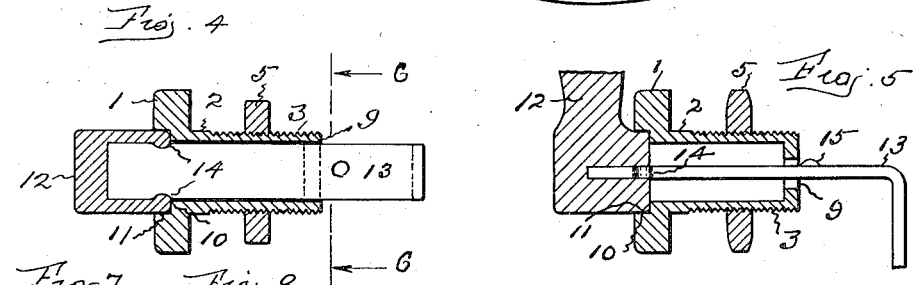
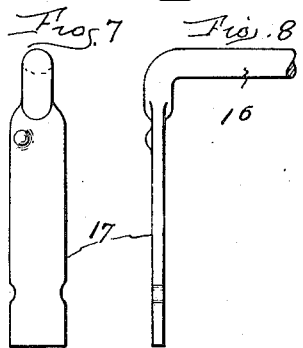
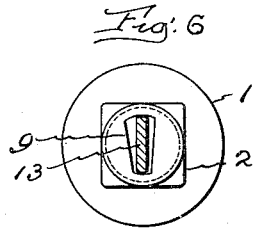
INVENTOR
Max R. Koerner
Harry P. Williams
atty.

Patented Jan. 21, 1941

2,229,459

UNITED STATES PATENT OFFICE 2,229,459

TANK VALVE LEVER

Max. R. Koerner, West Hartford, Conn., assignor to The M. S. Little Mfg. Company, Hartford, Conn., a corporation of Connecticut Application July 12, 1939, Serial No. 284,074

1 Claim. (Cl. 4—67)

This invention relates to single action levers that are provided for operating the flush valves of low down toilet tanks. These articles are commonly made by manufacturers of plumbers' fittings and shipped complete for assembly to pottery manufacturers.

The object of the invention is the provision of a very simple rugged and serviceable lever which, owing to its design has but few parts inexpensive to manufacture and which can be easily and quickly applied to a tank and secured in correct position to be connected to the flush valve.

In the accompanying drawing

Fig. 1 is a front view of a lever that embodies this invention.

Fig. 2 is a top view of the lever.

Fig. 3 is a section on the plane indicated by the dotted line 3—3 on Fig. 1.

Fig. 4 is a section on plane indicated by dotted line 4—4 on Fig. 1, with the end of the arm shown in section.

Fig. 5 is a section similar to that shown in Fig. 3 with the end of the arm shown in full lines.

Fig. 6 is a transverse section on the dotted line 6—6 on Fig. 4.

Fig. 7 is a face view of an arm of modified construction.

Fig. 8 is an edge view of the modified arm.

The device illustrated has a tubular shell comprised of a head 1, a squared section 2 and a threaded stem 3. This shell is designed to be applied to a tank by inserting the squared section into a similarly shaped opening in the wall 4 of the tank with the head on the outside of the tank and the threaded stem extending into the tank. The squared section prevents the shell from turning in the hole in the tank. A nut 5 is threaded onto the stem for tightly securing the shell in place. Fig. 2.

Through the inner and partly closed end of the threaded section of the shell illustrated is a transverse slot 9 which is substantially V-shaped, being wider at the top than at the bottom, and in the head is a cylindrical socket 10. Loosely fitting the socket in the head is the hub 11 of the handle 12.

The lever arm 13 is desirably formed of a strip of metal that is rectangular or oblong in cross section and it is bent at right angles so as to form an outer limb to which the valve is to be connected and an inner limb that loosely extends through the shell and into the handle to which it may be secured against removal by crimping the inner edge of the handle hub into notches 14 formed in the edges of the arm, Fig. 4. To prevent the shell from slipping away from the handle the arm may be indented to produce a knob 15 just beyond the slotted end of the shell. Fig. 3. The arm may, if desired, be formed of round rod 16 and flattened along the length 17 that is to pass through the shell and into the handle, as indicated in Figs. 7 and 8.

In assembling the structure the arm is thrust from the outside through the opening in the tank until the threaded section of the shell extends into the tank and the squared portion fits the hole in the tank. The nut is then slipped upon the arm and turned on the threaded stem of the shell until the wall of the tank is tightly clamped between the nut and head of the shell. This is the only manipulation that is required by the pottery manufacturer to secure the lever to the tank.

With the construction shown the handle and arm are securely joined and when the handle is pressed down the arm rocks in the angular slot in the end of the shell and causes the arm to lift the flush valve. When the handle is released the arm will rock in the shell slot and allow the valve to close. The limits of the rocking movements of the arm are controlled solely by the walls of the V-shaped slot in the end of the shell. This lever has but four members, the handle, the arm secured thereto, and the shell with the clamping nut. The walls of the slot in the end of the shell not only limit the rocking movements of the arm but they afford a bearing at this end of the shell for the arm, the bearing at the other end of the shell being the hub of the handle that extends into the socket in the head of the shell.

The invention claimed is:

A single action flush valve lever construction for toilet tanks which comprises a tubular shell, said shell having one end open and that end surrounded by a flange and having a closure with a substantially V-shaped transversely extending slot through it at the other end, a handle having a hub fitting loosely in a socket in the flanged end of the shell, an arm extending through the shell said arm having its inner end secured in the handle hub and having an oblong cross section extending loosely through and pivotally supported by the narrow end of the slot, and a projection from said arm positioned closely adjacent the outside surface of the slotted closure of the shell, whereby there is a relatively rotary movement of the shell and the arm which is limited by the engagement of the arm with the walls of the slot in said shell closure and the shell is retained between the handle hub and said projection from the arm.

MAX R. KOERNER.